(12) United States Patent
Allen et al.

(10) Patent No.: US 10,597,994 B2
(45) Date of Patent: Mar. 24, 2020

(54) ADAPTIVE LEVELING CONTROL SYSTEM

(71) Applicant: Harnischfeger Technologies, Inc., Wilmington, DE (US)

(72) Inventors: Charles Allen, St. Francis, WI (US); Eric Kuiper, Franklin, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 311 days.

(21) Appl. No.: 15/433,821

(22) Filed: Feb. 15, 2017

(65) Prior Publication Data

US 2017/0234119 A1     Aug. 17, 2017

Related U.S. Application Data

(60) Provisional application No. 62/295,319, filed on Feb. 15, 2016.

(51) Int. Cl.
*E21B 44/00* (2006.01)
*E21B 15/00* (2006.01)
*G05B 19/048* (2006.01)

(52) U.S. Cl.
CPC ............ *E21B 44/00* (2013.01); *E21B 15/00* (2013.01); *G05B 19/048* (2013.01); *G05B 2219/45129* (2013.01)

(58) Field of Classification Search
CPC ....... E21B 44/00; E21B 15/00; G05B 19/048; G05B 2219/45129
See application file for complete search history.

(56) References Cited

U.S. PATENT DOCUMENTS

| 2004/0040746 A1* | 3/2004 | Niedermayr | E21B 21/08 175/38 |
| 2006/0289205 A1* | 12/2006 | Law | E21B 7/024 175/40 |

(Continued)

FOREIGN PATENT DOCUMENTS

| AU | 2015204321 A1 | 2/2016 |
| CL | 2012003338 A1 | 10/2013 |

(Continued)

OTHER PUBLICATIONS

Examination Report issued from the Chilean Patent Office for related Application No. 201700385 dated Jan. 7, 2019 (12 pages including Statement of Relevance).

(Continued)

*Primary Examiner* — Stephanie E Bloss
(74) *Attorney, Agent, or Firm* — Michael Best & Friedrich LLP

(57) ABSTRACT

Industrial machines and methods of operating the same. One method includes receiving, with an electronic processor, a current value of a parameter of an industrial machine during operation of the industrial machine and comparing, with the electronic processor, the current value of the parameter to a stored value of the parameter to determine whether the industrial machine is unlevel. The method also includes, when the industrial machine is unlevel, autonomously, with the electronic processor, changing a position of at least one of a plurality of jacks to level the industrial machine, wherein autonomously changing the position of at least one of the plurality of jacks includes at least one selected from a group consisting of extending the at least one of the plurality of jacks and retracting the at least one of the plurality of jacks.

20 Claims, 12 Drawing Sheets

(56) References Cited

U.S. PATENT DOCUMENTS

| | | | |
|---|---|---|---|
| 2011/0112728 A1* | 5/2011 | Stacy, II | B66C 23/78 |
| | | | 701/49 |
| 2011/0247878 A1* | 10/2011 | Rasheed | E21B 10/32 |
| | | | 175/50 |
| 2013/0138305 A1 | 5/2013 | Colwell et al. | |
| 2013/0197737 A1* | 8/2013 | Malayappalayam | |
| | | Shanmugam | E21F 17/18 |
| | | | 701/29.1 |
| 2013/0291475 A1 | 11/2013 | Ruttley et al. | |
| 2014/0086716 A1 | 3/2014 | Knuth | |
| 2014/0188351 A1 | 7/2014 | Colwell et al. | |
| 2014/0330489 A1 | 11/2014 | Sakamoto et al. | |
| 2015/0053482 A1* | 2/2015 | Boone | E21B 7/022 |
| | | | 175/24 |
| 2015/0308073 A1 | 10/2015 | Voelz et al. | |
| 2016/0115670 A1 | 4/2016 | Lee | |

FOREIGN PATENT DOCUMENTS

| | | |
|---|---|---|
| CN | 104520524 A | 4/2015 |
| CN | 204283230 U | 4/2015 |
| CN | 105066950 A | 11/2015 |
| CN | 204899786 U | 12/2015 |
| JP | 2009221659 A | 10/2009 |

OTHER PUBLICATIONS

Chilean Patent Office Action for Application No. 2017-00385 dated Jun. 24, 2019 (12 pages including statement of relevance).
Chinese Patent Office action for Application No. 201710077721.6 dated Nov. 15, 2019 (11 pages).

\* cited by examiner

ADAPTIVE LEVELING CONTROL SYSTEM

RELATED APPLICATIONS

This application claims priority to U.S. Provisional Application No. 62/295,319 filed Feb. 15, 2016, the entire content of which is incorporated by reference herein.

BACKGROUND

Embodiments described herein relate to mining machines and, more particularly, relate to blasthole drill rigs and leveling control systems and methods for blasthole drill rigs.

SUMMARY

Blasthole drill rigs are commonly used in the mining industry to drill through hard rock. Blasthole drill rigs may be found, for example, in coal, copper, and diamond mines throughout the world. A blasthole drill rig may include a base, a drill tower extending vertically from the base, and one or more drill pipes that are coupled to and supported by the drill tower. The drill pipes extend into a borehole. A blasthole drill rig may also include one or more jacks that extend from the base to the surface (for example, the ground) supporting the blasthole drill rig.

In some embodiments, prior to starting a drilling operation, a blasthole drill rig is leveled. An operator may manually level the blasthole drill by manually moving each jack to a desired position (for example, using a joystick or a pushbutton). Alternatively or in addition, an operator may manually initiate an automatic leveling system that performs a sequence of predetermined operations to level the blasthole drill rig.

During operation, blasthole drill rigs may become unlevel or imbalanced, such as when there is jack drift, jack leakage, or when the ground supporting a jack softens, slips, or compacts. Accordingly, despite leveling a blasthole drill rig prior to operation the drill rig may nevertheless become unlevel during operation. The operator must identify that the blasthole drill rig is unlevel and either manually re-level the rig or manually initiate an automatic leveling process. In other words, when the blasthole drill rig becomes unlevel, manual intervention is required to correct the blasthole drill rig. However, it may be difficult or even impossible for an operator to manually identify when the blasthole drill rig has become unlevel. Furthermore, it may take an operator time to recognize that the blasthole drill rig is unlevel and to correct the issue. In the meantime, problems may occur during the time when the blasthole drill rig is unlevel. For example, an unlevel blasthole drill rig may compromise the quality of the drill hole and may damage or compromise components of the blasthole drill (for example, may cause bending of the drill pipe, damage to the drill bit, or excessive vibration that may lead to premature machinery wear).

Accordingly, embodiments described herein provide methods and systems for leveling an industrial machine, such as a blasthole drill rig. For example, one embodiment provides a method includes leveling the industrial machine through operation of at least one jack included in a plurality of jacks extending from the industrial machine to a surface supporting the industrial machine. The method also includes monitoring a current position of each of the plurality of jacks through a linear position transducer, monitoring a current inclination of the industrial machine using a level inclinometer, and monitoring a current pressure associated with each of the plurality of jacks with a pressure transducer. In addition, the method includes autonomously re-leveling the industrial machine based on the monitored current position of each of the plurality of jacks, the monitored current inclination of the industrial machine, and the monitored current pressure of each of the plurality of jacks.

For example, one embodiment described herein provides a method of operating an industrial machine including a base and a plurality of jacks coupled to the base, wherein each of the plurality of jacks extendable and retractable relative to the base to contact a surface supporting the industrial machine. The method includes receiving, with an electronic processor, a current value of a parameter of the industrial machine during operation of the industrial machine and comparing, with the electronic processor, the current value of the parameter to a stored value of the parameter to determine whether the industrial machine is unlevel. The method also includes, when the industrial machine is unlevel, autonomously, with the electronic processor, changing a position of at least one of the plurality of jacks to level the industrial machine, wherein autonomously changing the position of at least one of the plurality of jacks includes at least one selected from a group consisting of extending the at least one of the plurality of jacks and retracting the at least one of the plurality of jacks.

Another embodiment provides an industrial machine including a base, a plurality of jacks coupled to the base, a sensor configured to sense a value of a parameter of the industrial machine, and a controller in communication with the sensor. Each of the plurality of jacks is extendable and retractable relative to the base to contact a surface supporting the industrial machine. The controller is configured to receive, from the sensor, a current value of the parameter of the industrial machine during operation of the industrial machine, and compare the current value of the parameter to a stored value of the parameter to determine whether the industrial machine is unlevel. The controller is also configured to, when the industrial machine is unlevel, autonomously change a position of at least one of the plurality of jacks to level the industrial machine, wherein autonomously changing the position of the at least one of the plurality of jacks includes at least one selected from a group consisting of extending the at least one of the plurality of jacks and retracting the at least one of the plurality of jacks.

Other aspects will become apparent by consideration of the detailed description and accompanying drawings.

DETAILED DESCRIPTION

Before any embodiments are explained in detail, it is to be understood that the embodiments described herein are not limited in application to the details of construction and the arrangement of components set forth in the following description or illustrated in the accompanying drawings and may be practiced or carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct or indirect connections, wireless connections, and the like.

It should be noted that a plurality of hardware and software based devices, as well as a plurality of different structural components may be utilized to implement embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of embodiments described herein may be implemented in software (for example, stored on non-transitory computer-readable medium) executable by one or more processors. As such, it should be noted that a plurality of hardware and software based devices, as well as a plurality of different structural components may be utilized to implement the described embodiments. For example, "controller" and "control unit" described in the specification may include one or more electronic processors, one or more memory modules including non-transitory computer-readable medium, one or more input/output interfaces, and various connections (for example, a system bus) connecting the components.

Figure 1:
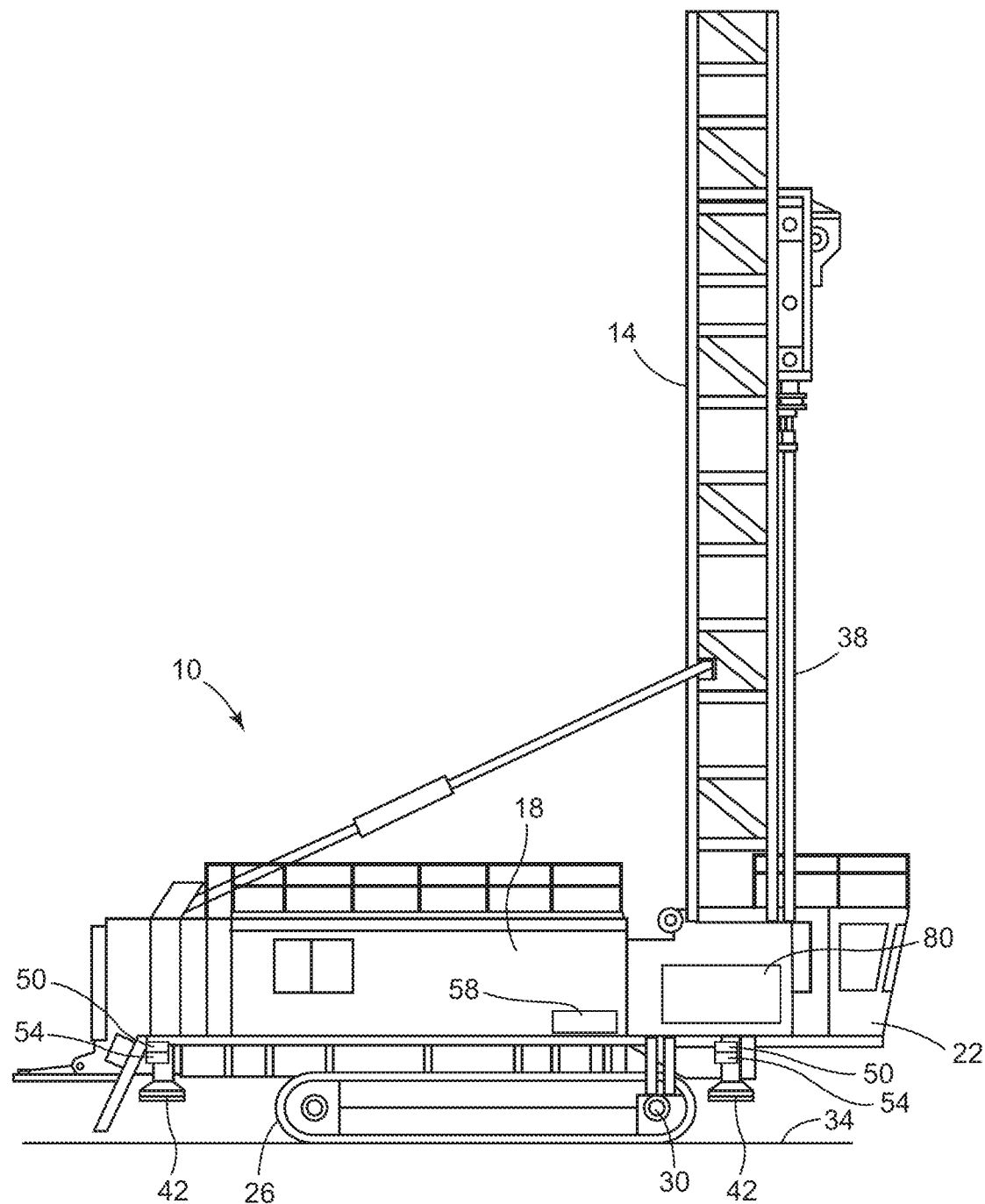
FIG. 1 is a side view of a blasthole drill rig according to one embodiment.

FIG. 1 illustrates a drill 10 according to one embodiment. Blasthole drill rigs 10 are commonly used in the mining industry to drill through hard rock. Prior to starting a drilling operation, the drill 10 is leveled. In addition, blasthole drill rigs 10 may become unlevel or imbalanced during operation. For example, blasthole drill rigs 10 may become unlevel when there is jack drift, jack leakage, or when the ground supporting a jack softens, slips, or compacts. Therefore, despite leveling a drill 10 prior to operation, the drill 10 may nevertheless become unlevel during operation. Problems may occur when the drill 10 is unlevel. For example, an unlevel drill 10 may compromise the quality of the drill hole and may damage or compromise components of the drill 10 (for example, may cause bending of the drill pipe, damage to the drill bit, or excessive vibration that may lead to premature machinery wear).

Accordingly, embodiments described herein provide methods and systems for operating an industrial machine, such as the drill 10 and, in particular, methods and systems for leveling an industrial machine, such as the drill 10. It should be understood that although embodiments are described herein for the drill 10, embodiments may be applied to or used in conjunction with a variety of industrial machines. For example, in some embodiments, the methods and systems described herein may be used with any industrial machine that is leveled prior to operation and may become unlevel during operation.

As illustrated in FIG. 1, the blasthole drill rig 10 (also referred to herein as drill 10, blasthole drill 10, drill rig 10, or rig 10) includes a mast or drill tower 14, a base 18 (for example, a machinery house) beneath the drill tower 14 that supports the drill tower 14, an operator's cab 22 coupled to the base 18, and crawlers 26 driven by a crawler drive 30 that move the drill 10 along a surface 34 (for example, the ground). The drill tower 14 is coupled to and supports a drill string 38 including a plurality of components such as, for example, drill pipes, a shock sub, a thread, a drill bit, and a bit stabilizer. The drill string 38 is configured to extend vertically downward through the surface 34 and into a borehole.

The drill 10 also includes one or more leveling jacks 42 to support the drill 10 on the surface 34. For example, in some embodiments, the drill 10 has four jacks 42 including a right front jack (RF), right rear jack (RR), left front jack (LF), and a left rear jack (LR). In other embodiments, the blasthole drill 10 has three jacks 42 including, for example, a right rear jack (RR), a left rear jack (LR), and a singular front jack (SF). Each jack 42 is movable relative to the base 18 and, in particular, is extendable and retractable to contact the surface 34. In some embodiments, each jack 42 is independently movable between a fully extended position and a fully retracted position and may be set to one or more positions between such positions. In the fully extended position, a jack 42 may contact the surface 34 to support the drill 10. When the drill 10 is not in use (for example, not drilling), the jacks 42 may be moved to the fully retracted position to allow the drill 10 to move via the crawlers 26. In some embodiments, the jacks 42 may be hydraulically driven. In other embodiments, the jacks 42 may be electrically driven. The drill 10 may also include one or more actuators for driving or operating the jacks 42. The one or more actuators may include one or more hydraulic actuators operated by hydraulic fluid pressure. For example, one or more hydraulic actuators may be used to extend or retract the jacks 42. Similarly, one or more electric motors may be used to drive the jacks 42.

Each jack 42 may be independently adjusted (for example, extended or retracted) to various positions by the actuators to level the drill 10. For example, when the surface 34 supporting the drill 10 is uneven or sloped, some of the jacks 42 may be extended further than other jacks 42 to accommodate for the uneven or sloped surface 34. The jacks 42 may also be adjusted to accommodate for other factors that may lead to an unlevel drill 10. For example, the jacks 42 may be adjusted to accommodate for factors such as jack drift, jack leakage, or when the surface 34 softens, slips, or compacts.

The drill 10 includes one or more sensors for monitoring one or more operating parameters of the jacks 42. For example, in the illustrated embodiment, each jack 42 includes a position sensor 50 and a pressure sensor 54. Each position sensor 50 senses the position of a jack 42 between a fully extended and a fully retracted position. It should be understood, that in some embodiments, multiple position sensors 50 are used to detect the position of a jack 42 and, in other embodiments, a single position sensor 50 may be used to detect the position of one or more jacks 42. The position sensors 50 may also monitor jack drift. In some embodiments, the position sensors 50 include linear transducers positioned within the jacks 42, such as within jack cylinders.

Each pressure sensor 54 senses a work demand pressure of a jack 42. As described in more detail below, the pressure sensors 54 may be used to detect whether a jack 42 is contacting the surface 34. For example, decreasing pressure experienced by a jack 42 may indicate that the surface 34 is compacting or slipping. Alternatively, a pressure change experienced by a jack 42 may indicate a problem with a jack 42 (for example, a hydraulic cylinder of the jack 42) or an actuator driving a jack 42 (for example, a pressurized fluid supply). It should be understood that, in some embodiments, multiple pressure sensors 54 are used to detect the pressure of a jack 42 and, in other embodiments, a single pressure sensor 54 may be used to detect the pressure of one or more jacks 42. In some embodiments, the pressure sensors 54 include demand pressure transducers.

The drill 10 may also include one or more slope sensors or inclinometers 58. The inclinometers 58 detect the incline or slope of the drill 10 and the direction of the slope. For example, in some embodiments, the drill 10 may include a first inclinometer that measures the slope of the drill 10 along an x-axis (a side-to-side slope of the drill 10) and a second inclinometer that measures the slope along a y-axis (a front-to-back slope of the drill 10). As described in more detail below, the slope detected by the inclinometer 58 may be used to determine what position, such as degree of extension, each jack 42 should be in to level the drill 10. For example, when the inclinometers 58 indicate that the drill 10 is sloping downward to the left, the left front and left rear jacks 42 may be extended farther than the right front and right rear jacks 42. In some embodiments, one or more of the inclinometers 58 may be mounted on the base 18, such as the chassis, close to the drill tower 14. In other embodiments, one or more of the inclinometers 58 may be mounted at other locations on the drill 10, such as the drill tower 14, the crawlers 26, the cab 22, and the like.

Figure 2:
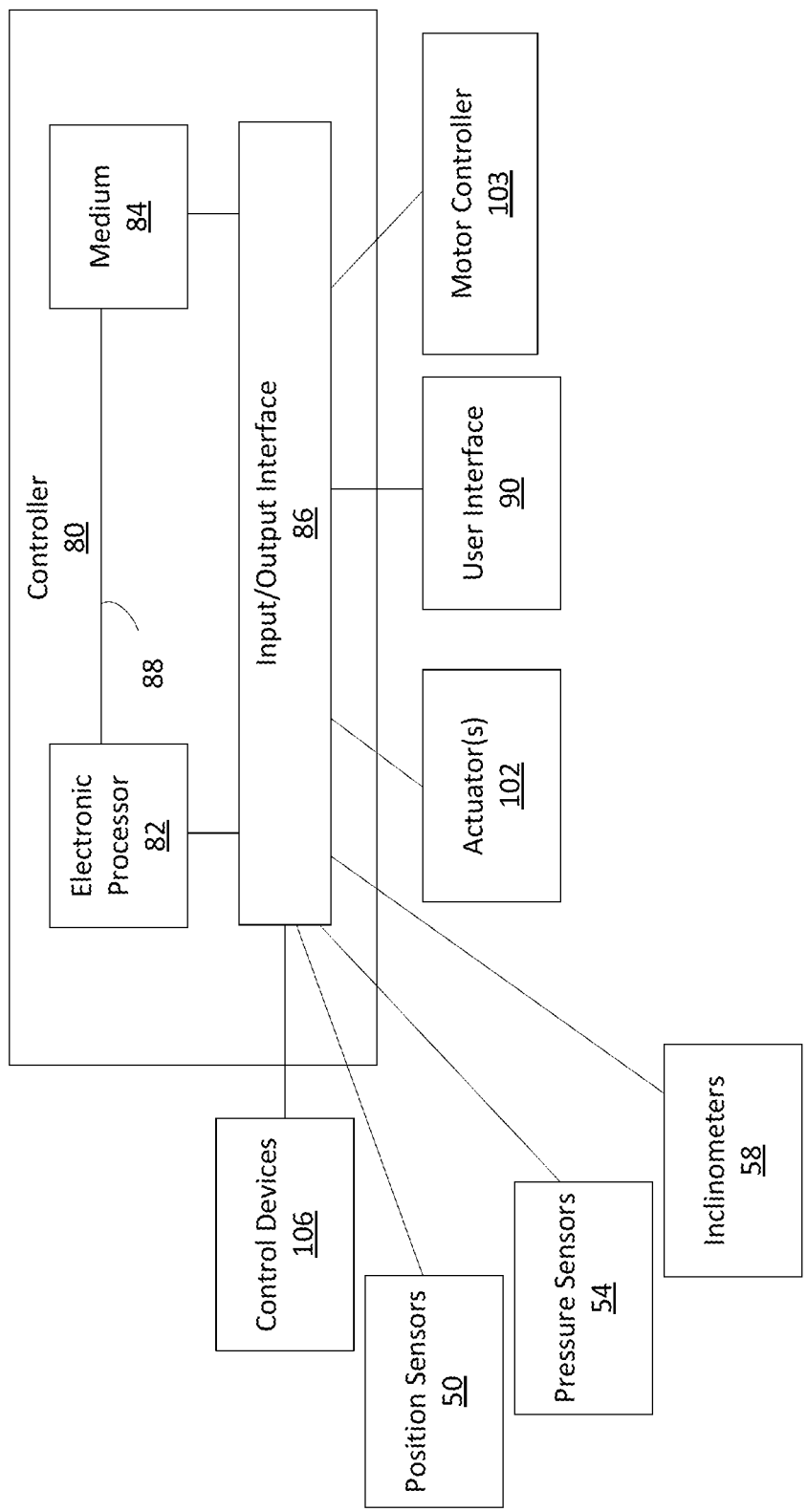
FIG. 2 schematically illustrates a controller providing leveling control for the blasthole drill rig of FIG. 1.

To manage the levelness and improve the stability of the drill 10, a controller 80 may be configured to monitor operations of the drill 10, detect an unlevel condition of the drill 10, and automatically modify operation of the drill 10 to maintain the drill 10 in a level state. For example, FIG. 2 schematically illustrates a controller 80 according to one embodiment. The controller 80 may be installed on the drill 10 (see, for example, FIG. 1) or may be remote from the drill 10, such as included as part of a remote control device or station for the drill 10. As illustrated in FIG. 2, the controller 80 may include an electronic processor 82, a non-transitory computer-readable medium 84, and an input/output interface 86. The electronic processor 82, the computer-readable medium 84, and the input/output interface 86 are connected by and communicate through one or more control and/or data communication lines or buses 88. It should be understood that in other constructions, the controller 80 includes additional, fewer, or different components. Also, it should be understood that controller 80 as described in the present application may perform additional functionality than the leveling functionality described in the present application. Also, the functionality of the controller 80 may be distributed among more than one controller.

The computer-readable medium 84 stores program instructions and data. The electronic processor 82 is configured to retrieve instructions from the computer-readable medium 84 and execute, among other things, the instructions to perform the methods described herein. The electronic processor 82 may include a microprocessor, an application-specific integrated circuit, or other electronic processing device. The input/output interface 86 communicates with systems, networks, and devices located remote from the controller 80 (for example, over one or more wired and/or wireless connections). The input/output interface 86 may provide received data to the electronic processor 82 and, in some embodiments, may store received data to the computer-readable medium 84.

As illustrated in FIG. 2, the controller 80 may be configured to communicate with the one or more actuators 102, which are used to operate the jacks 42 as described above. In a hydraulic drill 10, the actuators 102 may include one or more hydraulic fluid systems. Similarly, in an electric drill 10, the actuators 102 may include one or more electric motors. It should be understood that, in some embodiments, the controller 80 communicates with the actuators 102 directly and, in other embodiments, the controller 80 communicates with one or more of the actuator 102 through an actuator controller, such as a motor controller 103. For example, as described in more detail below, when the controller 80 determines that operation of one of the actuators 102 needs to be modified to control levelness of the drill 10, the controller 80 may send a signal to the actuator controller, which may communicate with the actuator 102 to implement the signal received from the controller 80.

As also illustrated in FIG. 2, the controller 80 may communicate with the sensors 50, 54, and 58 associated with the drill 10. For example, the controller 80 may communicate with the position sensors 50, pressure sensors 54, and the inclinometers 58. Furthermore, in some embodiments, the controller 80 receives input from one or more operator control devices 106, such as a joystick, a lever, a foot pedal, another actuator operated by the operator to control operation of the drill 10, or a combination thereof. For example, the operator may use the operator control device 106 to issue commands, such as extension or retraction of a jack 42 or to initiate a leveling operation of the drill 10. It should be understood that, in some embodiments, one or more of the user interface 90, the actuators 102, the actuator controller, and the operator control devices 106 may be included in the controller 80.

In some embodiments, the controller 80 communicates with a user interface 90 (for example, through the input/output interface 86). The user interface 90 may allow an operator to operate the drill 10 and, in some embodiments, displays feedback to an operator regarding whether the controller 80 has detected an unlevel condition (for example, by generating a warning or providing an indication when automatic leveling control is activated). For example, the user interface 90 may display information including a degree of incline of the drill 10 and a direction of the incline, a position (for example, a degree of extension) of each the jacks 42, a demand pressure of each of the jacks 42, notifications (for example, visual, audible, tactile, or combinations thereof), such as when an unstable condition has been detected for the drill 10 and, consequently, when automatic leveling control is being provided by the controller 80, or a combination thereof. In some embodiments, the user interface 90 also allows a user to change a mode of operation of the controller 80, such as whether the controller 80 should operate in an autonomous mode, an automatic mode, or a manual mode. Accordingly, the user interface 90 may be configured to receive a change of mode from an operator and automatically change the mode of operation of the controller 80 accordingly.

As noted above, the electronic processor 82 is configured to retrieve instructions from the computer-readable medium 84 and execute, among other things, the instructions to control the drill 10. For example, as noted above, the controller 80 may be configured to perform leveling control for the drill 10. In some embodiments, the drill 10 may be operated in three different modes: a manual mode, an automatic mode, and an autonomous mode. The drill 10 may be leveled using each of these modes. When the drill 10 is in manual mode, an operator uses the user interface 90 and the operator control devices 106 to manually level the drill 10. For example, based on input received from the operator, the controller 80 executes instructions to perform desired leveling tasks. In the manual mode, none of the tasks are automatically initiated. Rather, the operator must level the blasthole drill by adjusting the jacks 42 manually.

In contrast, when the drill 10 is in automatic mode, the operator may select a selection mechanism (for example, a mechanical or virtual button) on the user interface 90 to initiate an automatic leveling process. In this mode, the controller 80 executes instructions to carry out a predetermined leveling process. In other words, in automatic mode, the operator initiates the leveling process and the controller 80 automatically performs the process based on a set of predetermined operations.

When the drill 10 is in autonomous mode, the operator is not required to initiate the leveling process. Rather, the controller 80 monitors the drill 10 and automatically initiates leveling sequences when the controller 80 detects that the drill 10 is no longer level. In this mode, the controller 80 may monitor and adjust operation of the drill 10 in approximately a continuous manner, such as in real-time. In some embodiments, the autonomous mode also performs an initial leveling of the blasthole drill, which may be performed manually or automatically as noted above for the manual mode and the automatic mode.

Figure 3:
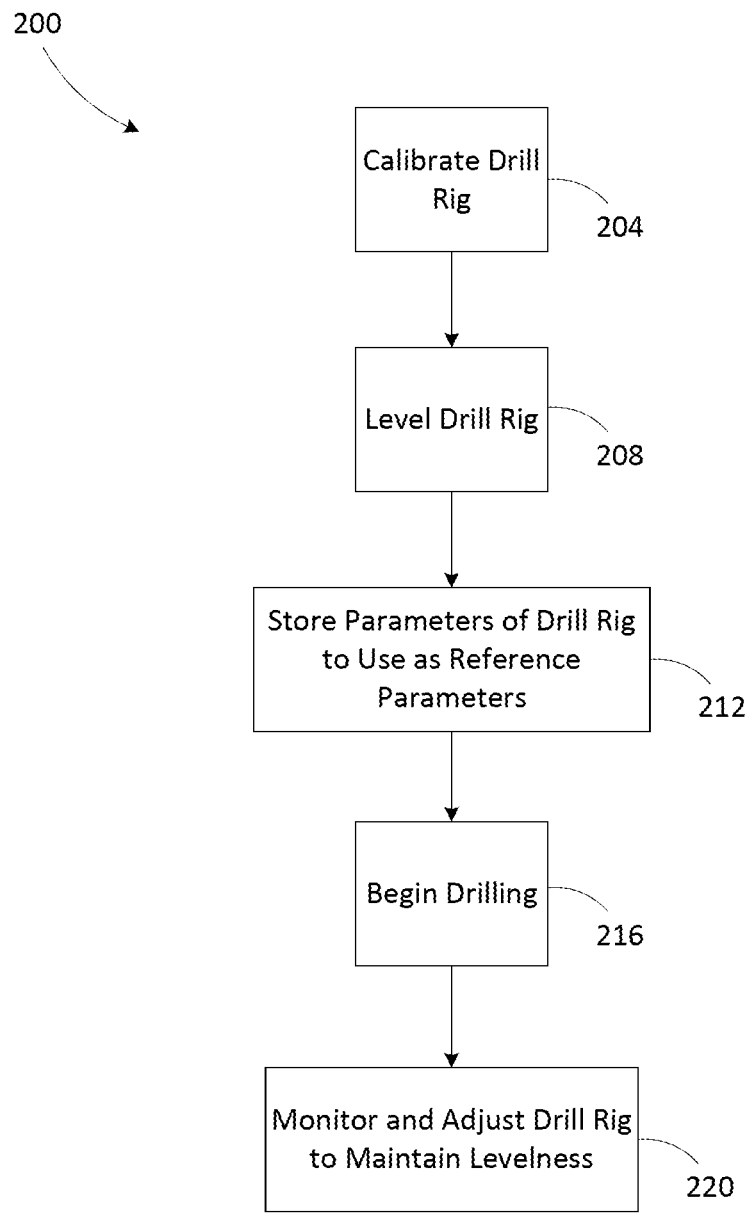
FIG. 3 is a flowchart illustrating a method of operating the blasthole drill rig of FIG. 1 in an autonomous mode of operation according to one embodiment.

FIG. 3 illustrates a method 200 of operating the drill 10 in an autonomous mode of operation. The method 200 may be described herein as being performed by the controller 80 and, in particular, the electronic processor 82 included in the controller 80 executing instructions (for example, stored in the computer-readable medium 84). As illustrated in FIG. 3, the controller 80 may repeatedly monitor and maintain the levelness of the drill 10. Specifically, the controller 80 may be configured to calibrate the drill 10 (at block 204) and perform one or more leveling operations on the drill 10 (at block 208) to initially level the drill 10. After the drill 10 is initially leveled, the controller 80 stores a value of one or more parameters of the drill 10 (at block 212). Drilling with the drill 10 may be started after the drill 10 is initially leveled (at block 216). Thereafter, the controller 80 monitors the current value of the one or more parameters of the drill 10 during operation (at block 220) and takes one or more automatic actions to maintain the drill 10 at a level state based on monitored current parameters and the stored parameters of the drill 10 (at block 220). For example, as described in more detail below, the controller 80 may monitor current operating parameters of the drill 10 and compare the monitored, current operating parameters to the stored reference parameters. When one of the monitored parameters falls outside of an allowable range of a stored parameter, the controller 80 may automatically adjust the drill 10 (for example, may automatically change the position of one or more of the jacks 42) to bring the drill 10 back to a level state. For example, when a monitored parameter falls outside of an allowable range of a stored parameter, the controller 80 may extend or retract one or more of the jacks 42 until the monitored operating parameter falls within the allowable range.

Figure 4:
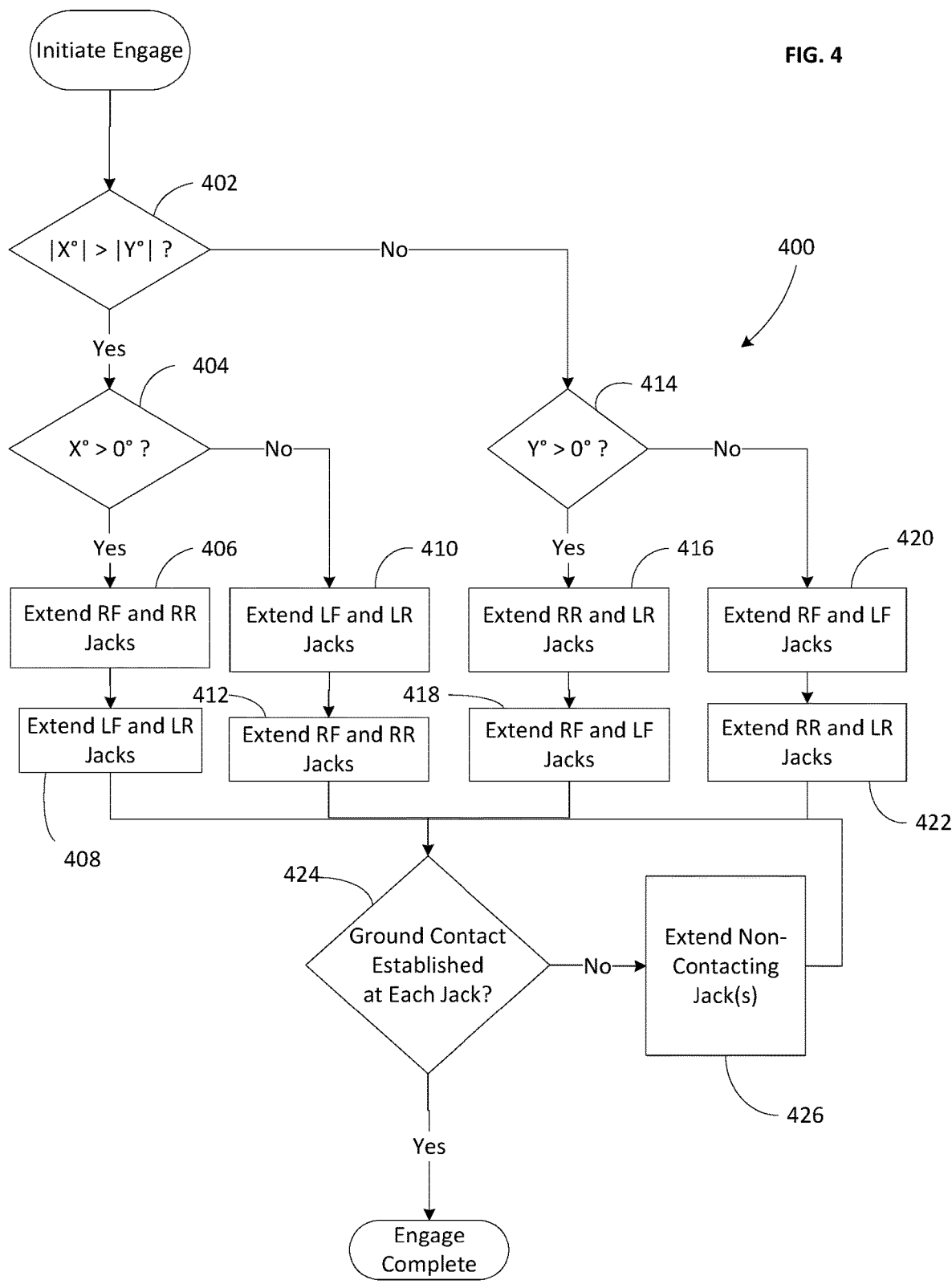
FIG. 4 is a flowchart illustrating a method of calibrating the blasthole drill rig of FIG. 1 according to one embodiment.

To calibrate the drill 10, the controller 80 may extend all of the jacks 42 until each jack 42 reaches the surface 34. FIG. 4 illustrates a method 400 of calibrating the drill 10 according to one embodiment. The controller 80 may perform the method 400 illustrated in FIG. 4 at block 204 of FIG. 3. As part of the method 400, the controller 80 determines a sequence for extending the jacks 42 based on an orientation of the drill 10. For example, the controller 80 may determine a side-to-side slope of the drill 10 (in the x-direction and represented by the variable X° in the following equations) and a front-to-back slope of the drill 10 (in the y-direction and represented by the variable Y° in the following equations) based on data received from the one or more inclinometers 58 installed in the drill 10. As illustrated in FIG. 3, the controller 80 may then compare the side-to-side slope of the drill 10 and the front-to-back slope of the drill 10 to determine in which direction the slope is greater as illustrated in Equation (1) (at block 402):

$$|X°| > |Y°| \qquad \text{Equation (1)}$$

When the side-to-side slope is greater than the front-to-back slope, the controller 80 adjusts the level of the drill 10 from side-to-side. For example, the controller 80 may determine whether the side-to-side slope is right-side-sloping (the right side is lower than the left side) or left-side-sloping (the left side is lower than the right side). In particular, when X°>0 (at block 404), the drill 10 is right-side-sloping, and the controller 80 extends the right front jack (RF) and the right rear jack (RR) (at block 406) prior to extending the left front jack (LF) and the left rear jack (LR) (at block 408). Similarly, when X°<0 (at block 404), the drill 10 is left-side-sloping, and the controller 80 extends the left front jack (LF) and the left rear jack (LR) (at block 410) prior to extending the right front jack (RF) and the right rear jack (RR) (at block 412).

Alternatively, when the front-to-back slope is greater than the side-to-side slope (at block 402), the controller 80 adjusts the level of the drill 10 from front-to-back. For example, the controller 80 may determine whether the slope is rear-sloping (the rear is lower than the front) or front-sloping (the front is lower than the rear). In particular, when Y°>0 (at block 414), the drill 10 is rear-sloping, and the controller 80 extends the right rear jack (RR) and the left rear jack (LR) (at block 416) prior to extending the right front jack (RF) and the left front jack (LF) (at block 418). Similarly, when Y°<0 (at block 414), the drill 10 is front-sloping, and the controller 80 extends the right front jack (RF) and the left front jack (LF) (at block 420) prior to extending the right rear jack (RR) and the left rear jack (LR) (at block 422).

After extending one or more of the jacks 42, the controller 80 determines (for example, based on the pressure sensors 54) whether the jack 42 is contacting the surface 34 (at block 424). When a jack 42 is not contacting the surface 34, the controller 80 further extends the jack 42 until the jack 42 contacts the surface 34 (at block 426). It should be understood that in some embodiments, the controller 80 may initially extend one or more of the jacks 42 a predetermined amount before conducting the testing and adjustment illustrated in FIG. 4.

Figure 5:
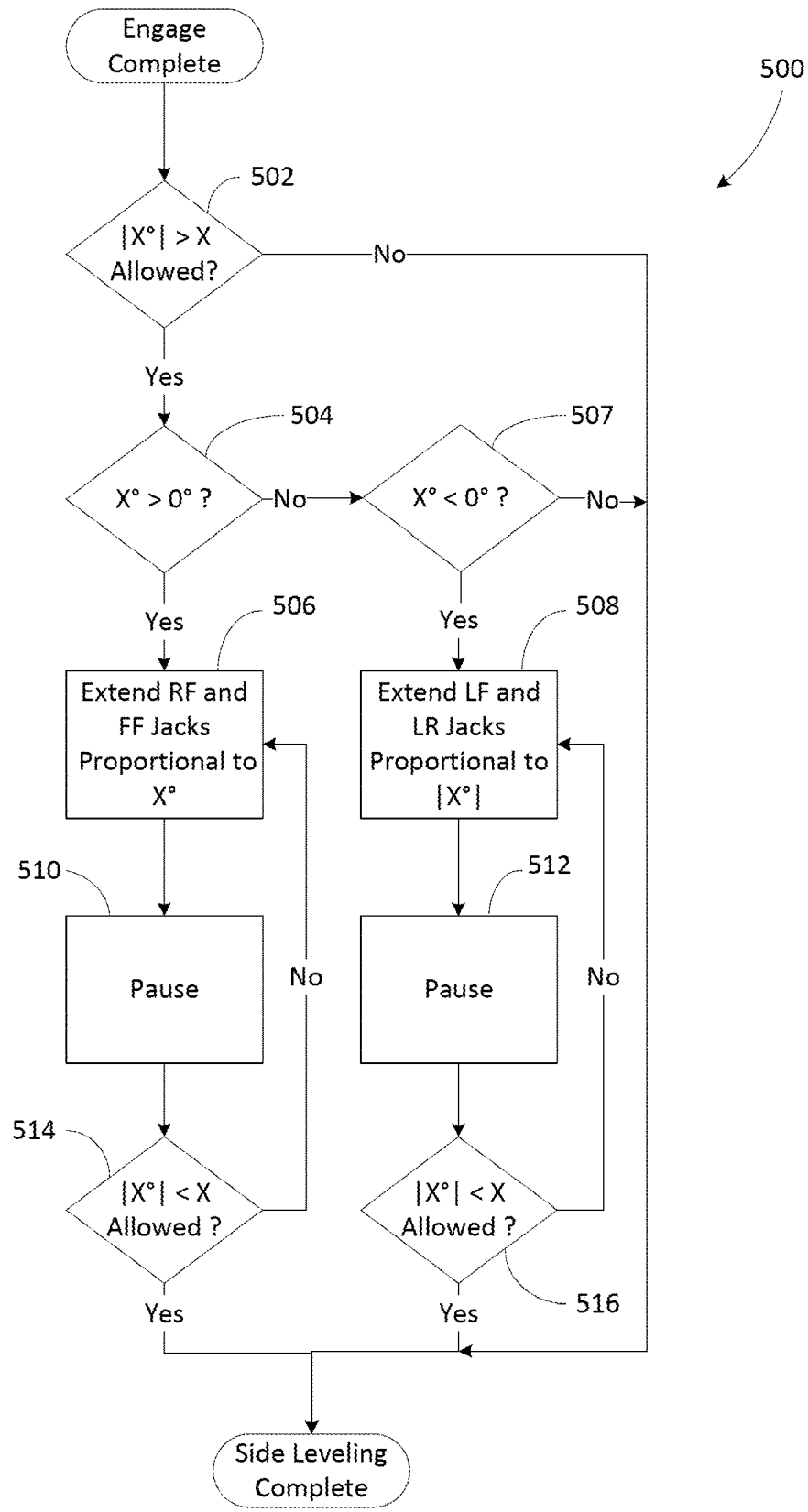
FIG. 5 is a flowchart illustrating a method of leveling the blasthole drill rig of FIG. 1 from side-to-side according to one embodiment.
Figure 6:
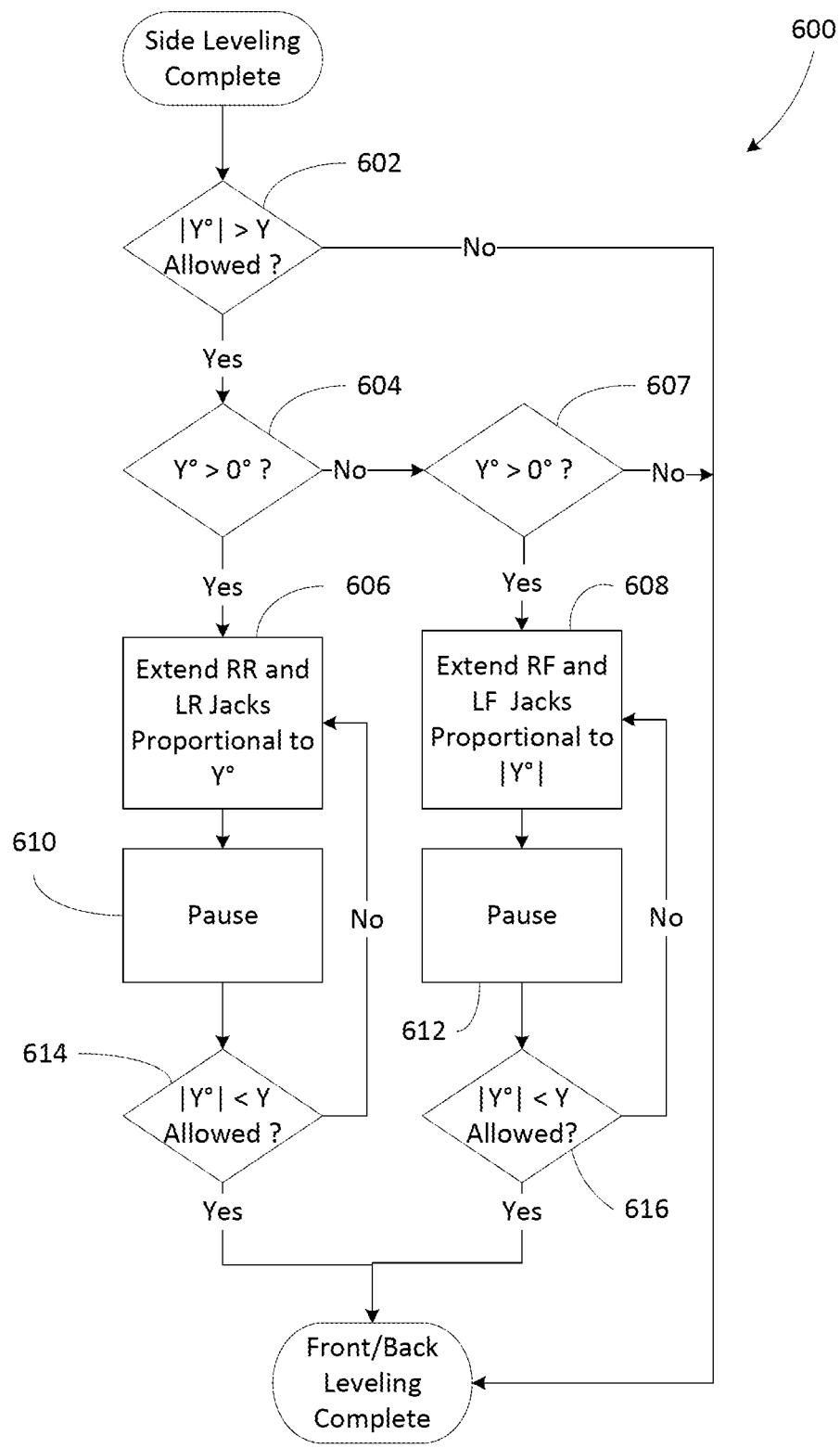
FIG. 6 is a flowchart illustrating a method of leveling the blasthole drill rig of FIG. 1 from front-to-back according to one embodiment.

Returning to FIG. 3, after calibrating the drill 10 (at block 204), the drill 10 is leveled prior to beginning drilling operations (at block 208). FIG. 5 illustrates a method 500 of leveling the drill 10 from side-to-side according to one embodiment, and FIG. 6 illustrates a method 600 of leveling the drill 10 from front-to-back according to one embodiment. The controller 80 may perform one or both of the methods 500 and 600 illustrated in FIGS. 5 and 6 at block 208 illustrated in FIG. 3.

As illustrated in FIG. 5, when performing side-to-side leveling, the controller 80 determines whether the side-to-side slope of the drill 10 is outside of an allowable range (for example, based on data received from one or more of the inclinometers 58) (at block 502). For example, as illustrated in Equation (2), the controller 80 may determine whether the side-to-side slope is greater than a predetermined degree represented by the variable "X allowed."

$$|X°| > X \text{ Allowed} \qquad \text{EQUATION (2)}$$

In some embodiments, the variable "X allowed" has a value of approximately 0.15 degrees. When the drill 10 is not sloping outside of the allowed range (is within the allowed range) (at block 502), no side-to-side leveling is necessary. In contrast, when the drill 10 is sloping outside of the allowed range (at block 502), the controller 80 determines whether the drill 10 is right-side-sloping or left-side-sloping. For example, when $X° > 0$ (at block 504), the drill 10 is right-side-sloping, and the controller 80 further extends the right front jack (RF) and the right rear jack (RR) proportional to X° (at block 506). When $X° < 0$ (at block 507), the drill 10 is left-side-sloping, and the controller 80 further extends the left front jack (LF) and the left rear jack (LR) proportional to |X°| (at block 508). After each adjustment, the controller 80 may pause (at blocks 510, 512) and allow the drill 10 to settle from any bouncing or shaking that occurs during the movement of the jacks 42. The length of the pause may be configured based on the drill 10, the drilling environment, or other factors. After pausing (at blocks 510, 512), the controller 80 confirms whether the side-to-side slope of the drill 10 is within the allowable range (for example, based on data received from the inclinometer 58) (at blocks 514, 516). When the side-to-side slope is not within the allowable range (at blocks 514, 516), the controller 80 continues leveling the drill 10 from side-to-side (at blocks 506, 508).

When the side-to-slope is within the allowable range, the controller 80 levels the drill 10 from front-to-back. As illustrated in FIG. 6, similar to the method of leveling from side-to-side described above with respect to FIG. 5, when performing front-to-back leveling, the controller 80 determines whether the front-to-back slope of the drill 10 is outside of an allowable range (for example, based on data received from one or more of the inclinometers 58) (at block 602). For example, as illustrated in Equation (3), the controller 80 may determine whether the front-to-back slope is greater than a predetermined degree represented by the variable "Y allowed."

$$|Y°| > Y \text{ Allowed} \qquad \text{EQUATION (3)}$$

In some embodiments, the variable "Y allowed" has a value of approximately 0.15 degrees. When the drill 10 is not sloping outside of the allowed range (is within the allowable range) (at block 602), no front-to-back leveling is necessary. When the drill 10 is sloping outside of the allowed range (at block 602), the controller 80 determines whether the drill 10 is front sloping or rear sloping. For example, when $Y° > 0$ (at block 604), the drill 10 is rear-sloping, and the controller 80 further extends the right rear (RR) and left rear (LR) jacks 42 proportional to Y° (at block 606). When $Y° < 0$ (at block 607), the drill 10 is front sloping, and the controller 80 further extends the right front (RF) and left front (LF) jacks 42 proportional to |Y°| (at block 608). After each adjustment, the controller 80 may pause (at blocks 610, 612) and allow the drill 10 to settle from any bouncing or shaking that occurs during the movement of the jacks 42. The length of the pause may be configured based on the drill 10, the drilling environment, or other factors. After pausing (at blocks 610, 612), the controller 80 confirms whether the front-to-back slope of the drill 10 is within the allowable range (for example, based on data received from the inclinometer 58) (at blocks 614, 616). When the front-to-back slope is not within the allowable range (at blocks 614, 616), the controller 80 continues leveling the drill 10 from front-to-back (at blocks 606, 608).

In some embodiments, after the front-to-back slope is within the allowable range, the controller 80 may rerun the method 500 to make any needed additional side-to-side adjustments and may rerun the method 600 to make any needed additional front-to-back adjustments. These additional adjustments are sometimes referred to as leveling trim. It should be understood that, in some embodiments, no leveling trim is performed or leveling trim is only performed for one direction (side-to-side or front-to-back) and not both directions.

As illustrated in FIG. 3, once the leveling is complete (at block 208), the controller 80 stores values of one or more parameters of the drill 10 when the drill 10 is level (at block 212). As described below, the stored data may be used as a bench mark for the position and pressure of the jacks 42 when the drill 10 is level. In other words, the controller 80 stores reference parameters that the controller 80 later compares to monitored parameters of the drill 10 when the drill 10 is in operation.

Figure 7:
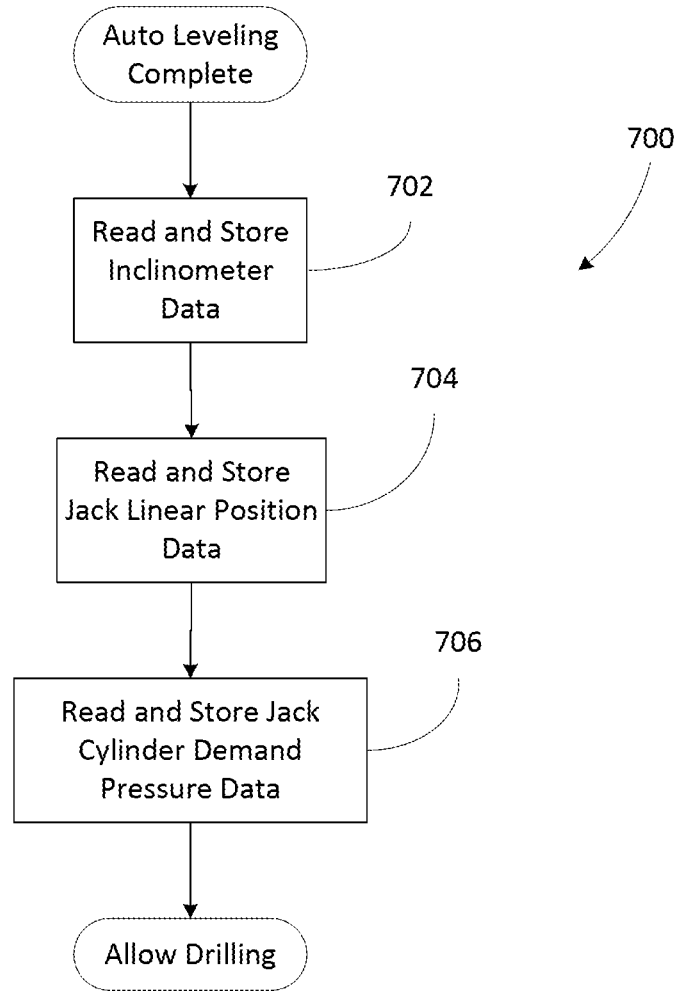
FIG. 7 is a flowchart illustrating a method of storing parameters of the blasthole drill rig of FIG. 1 according to one embodiment.

FIG. 7 illustrates a method 700 of storing parameters of the drill 10 accordingly to one embodiment. The controller 80 may perform the method 700 at block 212 illustrated in FIG. 3. As illustrated in FIG. 7, the method 700 may include reading and storing the slope of the drill 10 (for example, as measured by the one or more inclinometers 58, including, for example, the side-to-side slope and the front-to-back slope) (at block 702), reading and storing the position of each of the jacks 42 (for example, as measured by the position sensors 50) (at block 704), and reading and storing the pressure of each of the jacks 42 (for example, as measured by the pressure sensors 54) (at block 706). It should be understood that, in some embodiments, the controller 80 stores reference values of additional or fewer parameters.

Returning to FIG. 3, after the drill 10 is leveled (at block 208) and the reference parameters are stored (at block 212), the drill 10 is ready for operation (block 216). While the drill 10 is in operation, the controller 80 monitors the drill 10 and maintains the levelness of the drill 10 (block 220).

Figure 8:
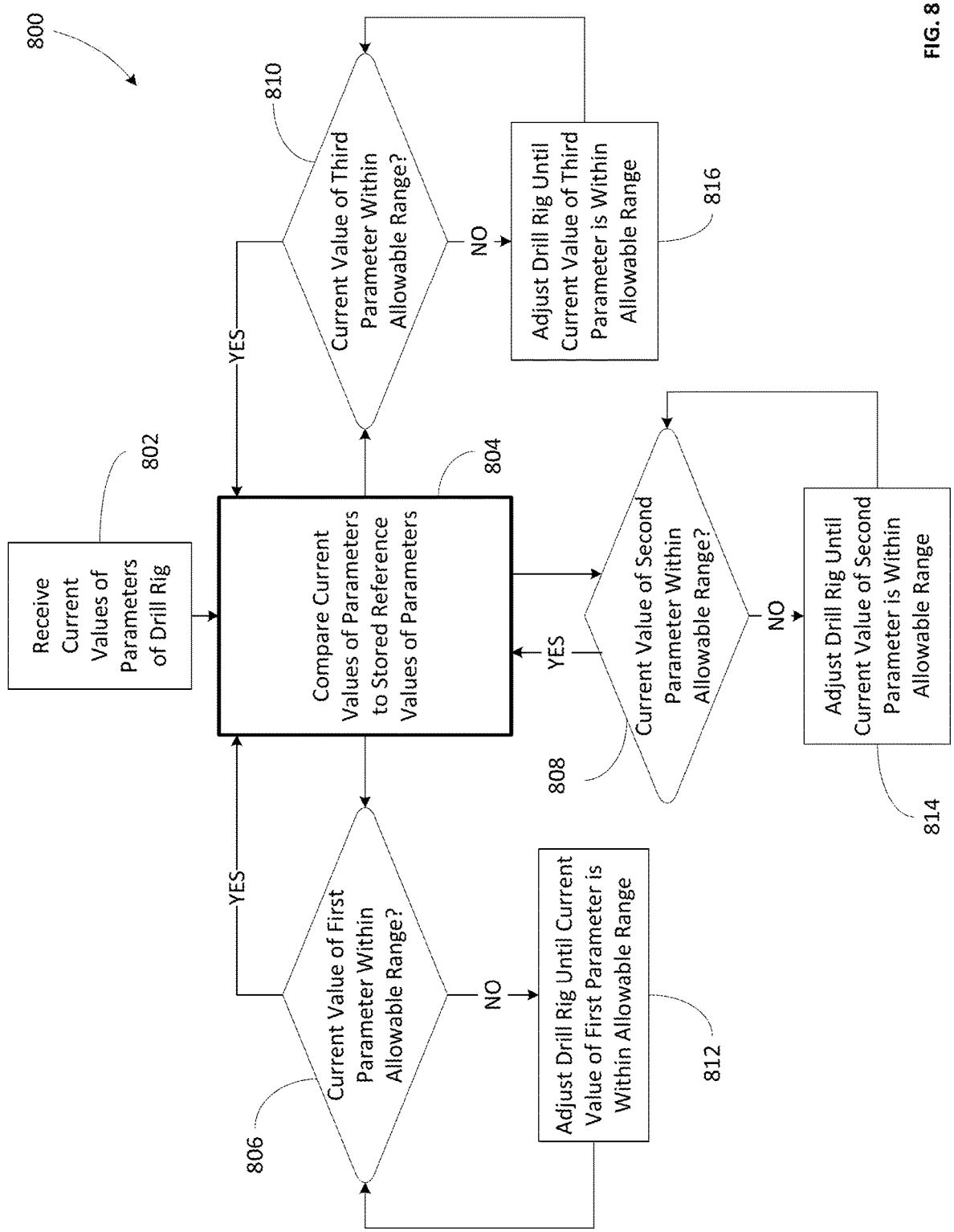
FIG. 8 is a flowchart illustrating a method of monitoring a current value of one or more parameters of the blasthole drill rig of FIG. 1 in parallel according to one embodiment.
Figure 9:
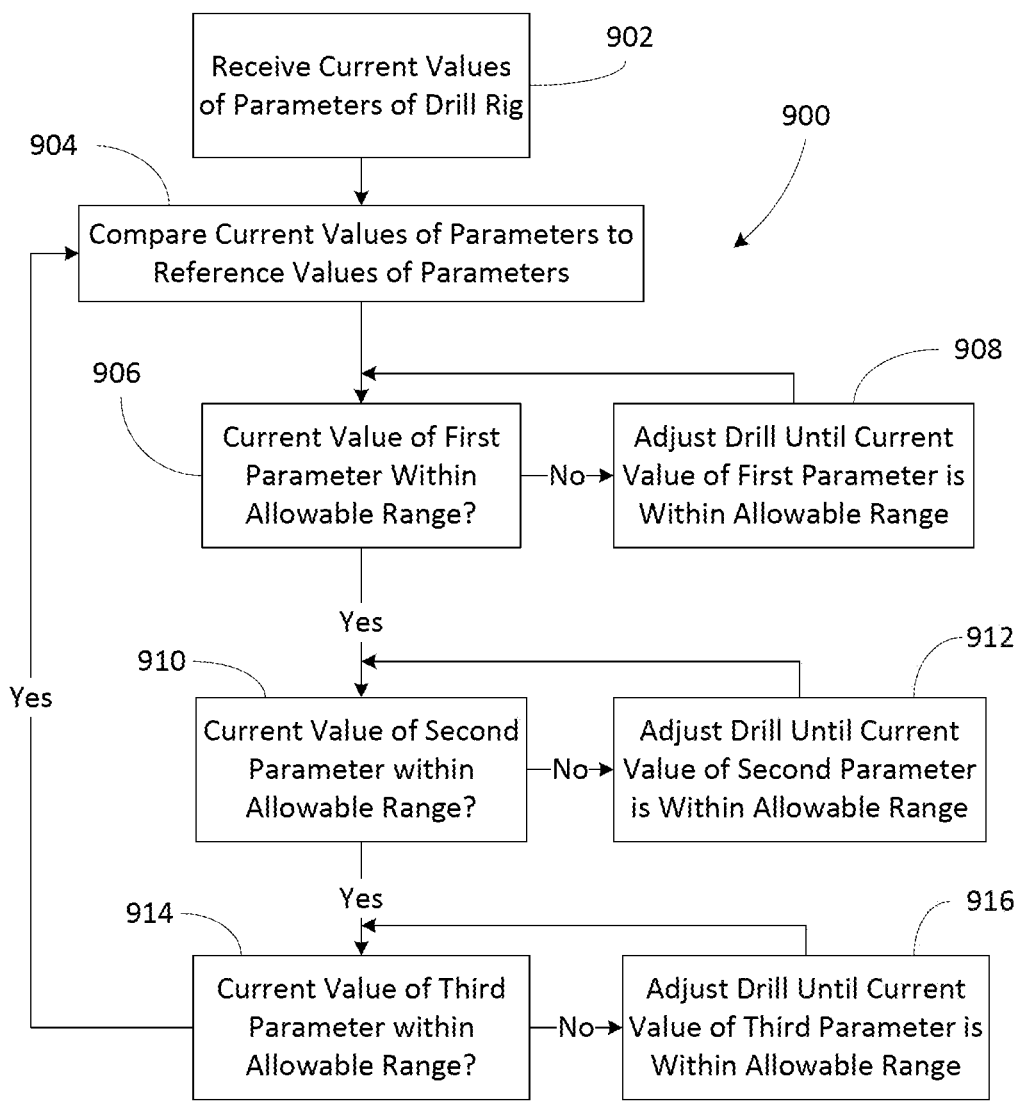
FIG. 9 is a flowchart illustrating a method of monitoring a current value of one or more parameters of the blasthole drill rig of FIG. 1 in series according to one embodiment.
Figure 10:
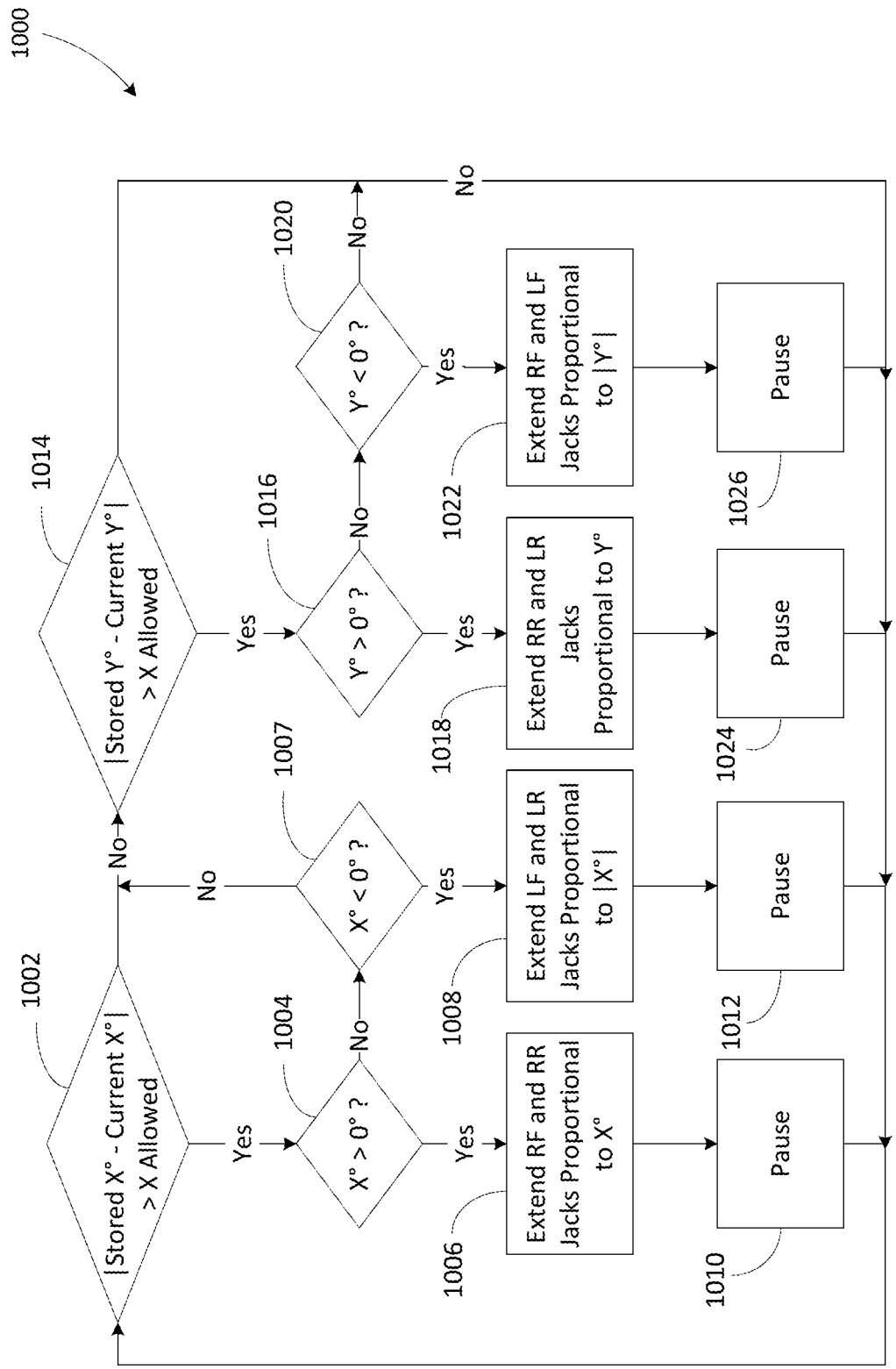
FIGS. 10-12 are flowcharts illustrating methods of adjusting the blasthole drill rig of FIG. 1 according to embodiments of the invention.
Figure 11:
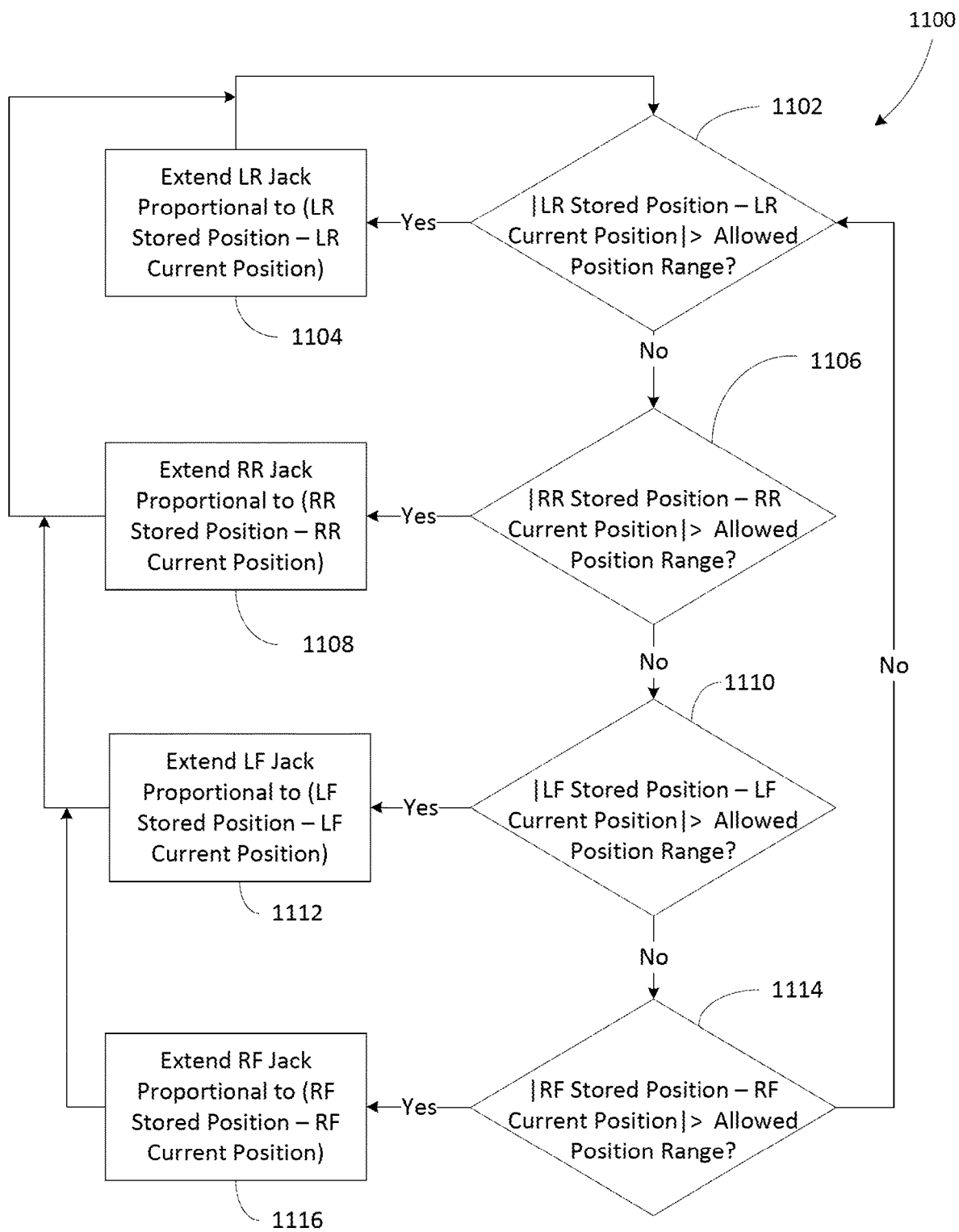
Figure 12:
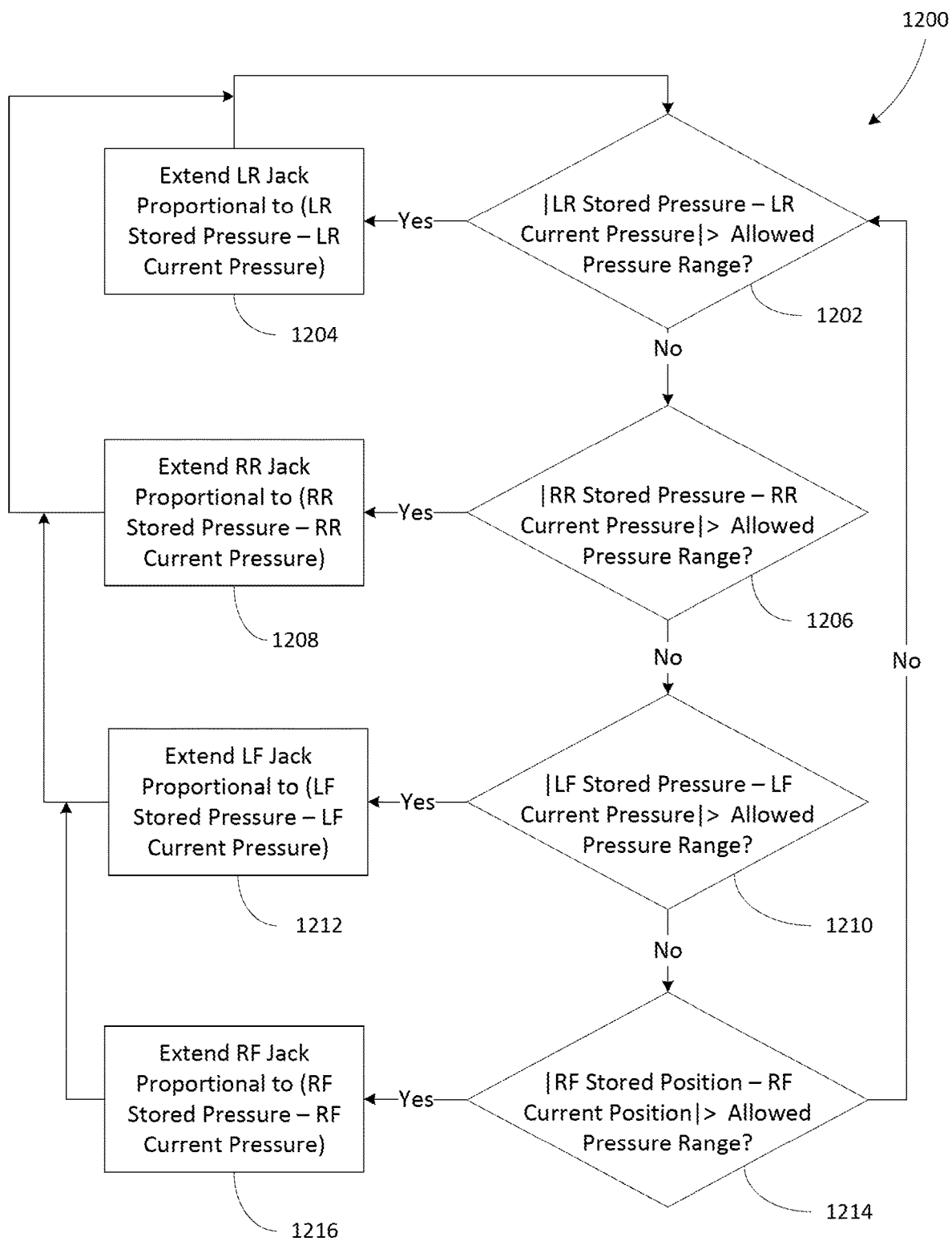

FIGS. 8-12 illustrate methods of monitoring the drill 10 and maintaining a level condition of the drill 10. The controller 80 may perform one or more of the methods illustrated in FIGS. 8-12 at block 220 illustrated in FIG. 3. For example, FIG. 8 illustrates a method 800 for monitoring a current value of one or more parameters of the drill 10 in parallel to identify when an adjustment to the drill 10 is needed. In contrast, FIG. 9 illustrates a method 900 for monitoring a current value of one or more parameters of the drill 10 in sequence to identify when an adjustment to the drill 10 is needed. FIGS. 10-12 illustrate methods for adjusting the drill 10 when the controller 80 identifies that an adjustment is needed. Accordingly, the methods of FIGS. 10-12 may be used with the method 800 to provide an adjustment, may be used with the method 900 to provide an adjustment, or a combination thereof.

For example, as illustrated in FIG. 8, the controller 80 may monitor current values of one or more parameters of the drill 10 in parallel. In this embodiment, the current values of multiple parameters are monitored simultaneously and adjustments based on such monitoring are performed simultaneously. For example, the current values of a first parameter (for example, the slope of the blasthole drill), a second parameter (for example, the position of the jacks 42), and a third parameter (for example, the pressure of the jacks 42) are monitored in parallel (at block 802). In particular, the controller 80 receives a current value of each parameter based on data sensed by one or more position sensors 50, one or more pressure sensors 54, one or more inclinometers 58, or a combination thereof. The controller 80 compares the current values of the monitored parameters to corresponding stored reference values of the parameters in parallel (at block 804) to determine whether the drill 10 is unlevel. In particular, the controller 80 performs the comparison to determine, in parallel, whether the current value each monitored parameter is within an allowable range of the applicable stored reference value of the parameter (at blocks 806, 808, 810). For example, the allowable range for the monitored side-to-side slope of the drill 10 may be within approximately 0.1 percent from the stored slope, and the allowable range for the monitored position of a jack 42 may be within approximately 5.0 percent from the stored position. When the current value of a monitored parameter falls outside of the allowable range (at blocks 806, 808, 810), the controller 80 adjusts the jacks 42 until a subsequent current value of the monitored parameter falls within the allowable range (at blocks 812, 814, 816). It should be understood that, in some embodiments, the allowable range for a slope (side-to-side slope, front-to-back slope, or both) of the drill 10, a position of a jack 42, and a pressure of a jacks 42 may be different. Also, in some embodiments, each jack 42 may have a unique allowable range for the jack's position, pressure, or both. For example, the allowable range for the pressure of the right front jack 42 (RF) may be within approximately 5.0 percent from the stored pressure and the allowable range for the pressure of the right rear jack 42 (RR) may be within approximately 3.0 percent from the stored pressure.

In FIG. 9, the controller 80 monitors the current values of one or more parameters in sequence. In this embodiment, the current value of one parameter at a time is compared to a reference value of the parameter and the drill 10 is adjusted as necessary. For example, the controller 80 may monitor the current values of one or more parameters (in parallel or sequentially) (at block 902) and compare the current values of the one or more parameters to applicable stored reference values for the one or more parameters (in parallel or sequentially) (at block 904). However, rather than adjusting the drill 10 based on each parameter in parallel as performed in the method 800, the controller 80 initially determines whether a current value for a first parameter (for example, a slope of the drill 10) falls within the applicable allowable range (at block 906). When the current value of the first parameter falls outside of the allowable range (at block 906), the controller 80 adjusts the jacks 42 accordingly until a subsequent current value of the monitored first parameter falls within the allowable range (at block 908). After the current value for the monitored first parameter falls within the allowable range (for example, either initially or after adjustment), the controller 80 determines whether a current value of a second parameter (for example, the position of one or more of the jacks 42) falls within the applicable allowable range (at block 910). When the current value of the monitored second parameter falls outside of the allowable range (at block 910), the controller 80 adjusts the jacks 42 until a subsequent current value of the monitored second parameter falls within the allowable range (at block 912). Similarly, after a subsequent current value of the monitored second parameter falls within the allowable range (for example, either initially or after adjustment), the controller 80 determines whether a current value of a third parameter (for example, the pressure of one or more of the jacks 42) falls within the applicable allowable range (at block 914). When the current value of the monitored third parameter falls outside of the allowable range (at block 914), the controller 80 adjusts the jacks 42 until a subsequent current value of the monitored third parameter falls within the allowable range (at block 916). As illustrated in FIG. 9, the method 900 may repeat. For example, after a current value of the third parameter falls within the allowable range, the controller 80 may determine whether a current value of the monitored first parameter falls within the allowable range again. Also, as noted above with respect to FIG. 8, it should be understood that the allowable ranges for the parameters may vary and may vary for individual jacks 42. In addition, although FIGS. 8 and 9 illustrate monitoring values of three parameters, the values of greater or fewer parameters may be monitored and corrected. Also, in some embodiments, the method 800 may monitor values of different parameters than the method 900.

FIGS. 10-12 illustrate methods 1000, 1100, 1200 of adjusting the drill 10 to maintain the levelness of the drill 10. For example, FIG. 10 illustrates a method 1000 of adjusting a slope of the drill 10 (for example, the side-to-side slope and the front-to-back slope). FIG. 11 illustrates a method 1100 of adjusting the positions of the jacks 42, and FIG. 12 illustrates a method 1200 of adjusting the pressure of the jacks 42. Again, one or more of these methods 1000, 1100, and 1200 may be performed by the controller 80 at block 220 of FIG. 3 (for example, individually or in combination with methods 800, 900, or both). For example, these methods 1000, 1100, and 1200 may be combined and arranged according to the methods 800 and 900 of FIGS. 8 and 9 to monitor and adjust the drill 10. In particular, one or more of the methods 1000, 1100, and 1200 may be combined as in method 800 to monitor the drill 10 and make adjustments in parallel. In this case, one or more of the methods 1000, 1100, and 1200 would be performed in parallel. Likewise, one or more of the methods 1000, 1100, and 1200 may be combined as in method 900 to monitor the drill 10 and make adjustments in series. In this case, one or more of the methods 1000, 1100, and 1200 would be performed sequentially. Also, although the methods 1000, 1100, and 1200 are described below as occurring in a certain order, the methods 1000, 1100, and 1200 may be performed in any order.

FIG. 10 illustrates a method 1000 of adjusting a slope (or incline) of the drill 10. As part of the method 1000, the controller 80 monitors the current side-to-side slope of the drill 10 (for example, based on data from one or more of the inclinometers) and compares the current side-to-side slope with a reference side-to-side slope that was previously stored (at block 1002). In particular, the controller 80 calculates a difference between the reference slope and the current, monitored slope. When the difference is not outside an allowable range (for example, represented by the variable "X Allowed" in FIG. 10) (at block 1002), no side-to-side adjustment of the jacks 42 is performed. However, when the difference is outside the allowable range (at block 1002), the controller 80 adjusts one or more of the jacks 42 to correct for the slope. For example, as illustrated in FIG. 10, the controller 80 may determines whether the slope is right-side sloping or left-side sloping. When X°>0 (at block 1004), the drill 10 is right-side sloping, and the controller 80 extends the right front and right rear jacks 42 proportional to X° (at block 1006). When X° is <0 (at block 1007), the drill 10 is left-side sloping, and the controller 80 extends the left front (LF) and left rear (LR) jacks 42 proportional to |X°| (at block 1008). After each adjustment (at blocks 1006, 1008), the controller 80 may pause (at blocks 1010, 1012) and allow the drill 10 to settle from any bouncing or shaking that occurs during the movement of the jacks 42. The length of the pause may be configurable based on the drill 10, the drilling environment, or other factors. After pausing (at blocks 1010, 1012), the controller 80 again determines whether the side-to-side slope of the drill 10 is outside of the allowable range (for example, based on data received from the inclinometer 58) (at block 1002). When the side-to-side slope is still outside of the allowable range (at block 1002), the controller 80 continues performing side-to-side levelling as described above. In some embodiments, the variable "X allowed," as used in method 1000, has a value of approximately 0.1 degrees.

As illustrated in FIG. 10, the controller 80 similarly monitors and compares the current front-to-back slope with the stored, reference front-to-back slope. When the difference is not outside an allowable range (is within the allowable range) (represented by the variable "Y allowed" in FIG. 10) (at block 1014), no front-to-back adjustment of the jacks 42 is performed. When the difference is outside of the allowable range (at block 1014), the controller 80 adjusts the jacks 42 to correct the front-to-back slope. In particular, the controller 80 determines whether the slope is front sloping or rear sloping. When Y°>0 (at block 1016), the drill 10 is rear sloping, and the controller 80 extends the right rear and left rear jacks 42 proportional to Y° (at block 1018). When Y°<0 (at block 1020), the drill 10 is front sloping, and the controller 80 extends the right front (RF) and left front (LF) jacks 42 proportional to |Y°| (at block 1022). After each adjustment (at blocks 1018, 1022), the controller 80 may pause (at blocks 1024, 1026) and allow the drill 10 to settle from any bouncing or shaking that occurs during the movement of the jacks 42. The length of the pause may be configurable based on the drill 10, the drilling environment, or other factors. After pausing (at blocks 1024, 1026), the controller 80 again determines whether the side-to-side slope of the drill 10 is outside of the allowable range (for example, based on data received from the inclinometer 58) (at block 1002) as described above. In other embodiments, after pausing (at blocks 1024, 1026), the controller 80 may again determine whether the front-to-back slope of the drill 10 is outside of the allowable range (at block 1014) before returning to side-to-side slope monitoring (at block 1002). In some embodiments, the variable "Y allowed," as used in method 1000, has a value of approximately 0.1 degrees.

FIG. 11 illustrates a method 1100 of adjusting the position of the jacks 42. As part of the method 1100, the controller 80 monitors the position of each jack 42 (for example, based on data received from one or more of the position sensors 50). The controller 80 compares the monitored position to the stored, reference position of each of the jacks 42. As will be understood, each jack 42 may have a different reference position and monitored position than the other jacks 42. For example, the controller 80 may be configured to calculate the difference between the current position and stored reference position of each jack 42. As an example, the controller 80 may calculate the difference between the current position and reference position of a first jack 42, such as the left right (LR) jack 42 (at block 1102). When the difference between the current position and the reference position of the first jack 42 is outside of the allowed range (represented by the variable "Allowed Position Range" in FIG. 11) (at block 1102), the controller 80 extends or retracts the first jack 42 proportional to the difference between the current position and reference position of the first jack 42 (at block 1104). When the difference between the current position and the reference position of the first jack 42 is not outside the allowed range (at block 1102), the controller 80 evaluates a second jack 42, such as a right rear (RR) jack 42. In some embodiments, the controller 80 performs a similar comparison and adjustment for the second jack 42 (at blocks 1106, 1108) as performed for the first jack 42. The controller 80 may repeat this process until all of the jacks 42 are within the allowed range. For example, after the second jack 42, the controller 80 may perform a similar comparison and adjustment for a third jack 42, such as the left front (LR) jack 42, (at blocks 1110, 1112) as performed for the first jack 42 and the second jack 42, and, after the third jack 42, the controller 80 may perform a similar comparison and adjustment for a fourth jack 42, such as the right front (RF) jack 42, (at blocks 1114, 1116) as performed for the first jack 42, the second jack 42, and the third jack 42. In some embodiments, the allowed range of each jack 42 is approximately 5.0 percent of the reference position. Also, it should be understood that the order that the jacks 42 are monitored may be different than the order illustrated in FIG. 11.

FIG. 12 illustrates a method 1200 of adjusting the pressure of the jacks 42. As part of the method 1200, the controller 80 monitors the demand pressure of each of the jacks 42 (for example, based on data received from one or more of the pressure sensors 54). The controller 80 compares the monitored pressure to the stored, reference pressure of each of the jacks 42. Each jack 42 may have a different reference pressure and monitored pressure than the other jacks 42. The controller 80 calculates the difference between the current pressure and reference pressure of each jack 42. For example, controller 80 calculates the difference between the current pressure and reference pressure of a first jack 42, such as the left rear (LR) jack 42 (at block 1202). When the difference between the current pressure and the reference pressure of the first jack 42 is outside of the allowed range (at block 1202) (represented by the variable "Allowed Pressure Range" in FIG. 12), the controller 80 extends or retracts the first jack 42 proportional to the difference between the current pressure and reference pressure of the first jack 42 (at block 1204). When the difference between the current pressure and the reference pressure of a first jack 42 is within an allowed range (at block 1202), the controller 80 evaluates a second jack 42, such as the right rear (RR) jack 42. In some embodiments, the controller 80 performs a similar comparison and adjustment for the second jack 42 (at blocks 1206, 1208) as performed for the first jack 42. The controller 80 may repeat this process until all of the jacks 42 are within the allowed range. For example, after the second jack 42, the controller 80 may perform a similar comparison and adjustment for a third jack 42, such as the left front (LF) jack 42, (at blocks 1210, 1212) as performed for the first jack 42 and the second jack 42, and after the third jack 42, the controller 80 may perform a similar comparison and adjustment for a fourth jack 42, such as the right front (RF) jack 42, (at blocks 1214, 1216) as performed for the first jack 42, the second jack 42, and the third jack 42. In some embodiments, the allowed range of each jack 42 is approximately 5.0 percent of the reference position. Also, it should be understood that the order that the jacks 42 are monitored may be different than the order illustrated in FIG. 12.

Accordingly, embodiments described herein provide systems and methods for maintaining a mining machine, such as a drill 10, level during operation to protect machine components and improve machine stability. As previously mentioned the methods and systems described herein may be used with different types of industrial machines and are not limited to blasthole drill rigs. Furthermore, when machines having greater or fewer jacks 42 are used, the methods may be adjusted to accommodate the correct number and configuration of the jacks 42. For example, a mining machine having only a singular front jack may be adjusted from front to back using only one front jack 42 rather than two jacks 42.

In addition, although the method 200 described herein is described as performed automatically, in some embodiments, portions of the method 200 may be performed manually. For example, in some embodiments, the process of calibrating the drill 10 (block 204) or initially leveling the drill 10 (at block 208) is carried out manually by an operator. Thereafter, the reference parameters may be stored, the drill 10 may be operated, and the monitoring and adjustment may be automatically performed as described herein.

Also, in some embodiments, the method 200 may include additional steps or fewer elements than those provided in FIG. 3. For example, in some embodiments, the initial calibrating (block 204) and initial leveling sequences (block 208) may be removed. In this case, the drill 10 is leveled by monitoring the drill 10 and adjusting the drill 10 during operation according to block 220. In another embodiment, an additional calibrating step may be added to the method 200. For example, the calibration step (block 204) may include retracting the jacks 42 to a fully retracted position and storing the fully retracted position as a reference parameter. This reference parameter may be used to ensure that the jacks are properly retracted prior to moving the drill 10.

Various features and advantages of the embodiments described herein are set forth in the following claims.

What is claimed is:

1. A method of operating an industrial machine including a base and a plurality of jacks coupled to the base, each of the plurality of jacks extendable and retractable relative to the base to contact a surface supporting the industrial machine, the method comprising:
receiving, with an electronic processor, a current value of a parameter of the industrial machine during operation of the industrial machine, the parameter sensed by a sensor on board the industrial machine;
comparing, with the electronic processor, the current value of the parameter to a stored value of the parameter to determine whether the industrial machine has an unlevel orientation; and
when the industrial machine has an unlevel orientation, autonomously leveling the industrial machine, with the electronic processor, by changing a position of at least one of the plurality of jacks to level the industrial machine, wherein autonomously changing the position of at least one of the plurality of jacks includes at least one selected from a group consisting of extending the at least one of the plurality of jacks and retracting the at least one of the plurality of jacks, wherein autonomously leveling the industrial machine includes automatically initiating, based on the current value of the parameter sensed by the sensor, a leveling process during a digging operation of the industrial machine.

2. The method of claim 1, wherein receiving the current value of the parameter of the industrial machine includes receiving a current position of each of the plurality of jacks sensed by at least one linear position transducer.

3. The method of claim 1, wherein receiving the current value of the parameter of the industrial machine includes receiving a current inclination of the industrial machine sensed by at least one inclinometer.

4. The method of claim 1, wherein receiving the current value of the parameter of the industrial machine includes receiving a current pressure of each of the plurality of jacks sensed by at least one pressure transducer.

5. The method of claim 1, wherein autonomously changing the position of at least one of the plurality of jacks to level the industrial machine includes autonomously changing the position of at least one of the plurality of jacks until a subsequent current value of the parameter of the industrial machine is within a range of the stored value of the parameter.

6. The method of claim 1, further comprising receiving a current value of a second parameter of the industrial machine sensed by a second sensor during the operation of the industrial machine and comparing the current value of the second parameter to a stored value of the second parameter to determine when the industrial machine has an unlevel orientation.

7. The method of claim 6, wherein receiving the current value of the second parameter includes receiving the current value of the second parameter in parallel with receiving the current value of the parameter.

8. The method of claim 1, further comprising calibrating the industrial machine, wherein calibrating the industrial machine includes extending each of the plurality of jacks until each of the plurality of jacks contacts the surface supporting the industrial machine.

9. The method of claim 8, wherein extending each of the plurality of jacks until each of the plurality of jacks contacts the surface supporting the industrial machine includes determining an orientation of the industrial machine and extending each of the plurality of jacks until each of the plurality of jacks contacts the surface supporting the industrial machine sequentially based on the orientation of the industrial machine.

10. The method of claim 9, wherein determining the orientation of the industrial machine includes determining a side-to-side slope of the industrial machine and a front-to-back slope of the industrial machine and comparing the side-to-side slope of the industrial machine to the front-to-back slope of the industrial machine.

11. The method of claim 1, further comprising automatically leveling the industrial machine prior to autonomously leveling the industrial machine, wherein automatically leveling the industrial machine includes performing a sequence of predetermined operations to level the industrial machine.

12. The method of claim 11, wherein automatically leveling the industrial machine includes leveling the industrial machine from side-to-side and leveling the industrial machine from front-to-back.

13. The method of claim 11, further comprising storing the stored value of the parameter based on a position of the industrial machine after automatically leveling the industrial machine and prior to autonomously leveling the industrial machine.

14. The method of claim 13, wherein storing the stored value of the parameter includes storing a slope of the industrial machine.

15. The method of claim 13, wherein storing the stored value of the parameter includes storing a position of each of the plurality of jacks.

16. The method of claim 13, wherein storing the stored value of the parameter includes storing a pressure of each of the plurality of jacks.

17. An industrial machine comprising:
a base;
a plurality of jacks coupled to the base, each of the plurality of jacks extendable and retractable relative to the base to contact a surface supporting the industrial machine;
a sensor configured to sense a value of a parameter of the industrial machine; and
a controller in communication with the sensor, the controller configured to
receive, from the sensor, a current value of the parameter of the industrial machine during operation of the industrial machine,
compare the current value of the parameter to a stored value of the parameter to determine whether the industrial machine has an unlevel orientation, and
when the industrial machine has an unlevel orientation, autonomously level the industrial machine by changing a position of at least one of the plurality of jacks to level the industrial machine, wherein autonomously changing the position of the at least one of the plurality of jacks includes at least one selected from a group consisting of extending the at least one of the plurality of jacks and retracting the at least one of the plurality of jacks, wherein the controller is configured to autonomously level the industrial machine includes by automatically initiating, based on the current value of the parameter sensed by the sensor, a leveling process during a digging operation of the industrial machine.

18. The industrial machine of claim 17, wherein the sensor includes at least one selected from a group consisting of a linear position transducer configured to sense the position of one of the plurality of jacks, an inclinometer configured to sense a slope of the industrial machine, and a pressure sensors configured to sense a pressure of one of the plurality of jacks.

19. The industrial machine of claim 17, further comprising a user interface configured to receive a change of mode of the controller, and wherein the controller is configured to disable autonomously changing the position of the at least one of the plurality of jacks in response to the change of mode of the controller.

20. The industrial machine of claim 17, wherein the controller is further configured to generate and provide a notification to an operator of the industrial machine when the industrial machine has an unlevel orientation.

* * * * *